United States Patent [19]

Ruell

[11] 4,171,766
[45] Oct. 23, 1979

[54] FALSIFICATION-PROOF IDENTIFICATION CARD HAVING A LIPPMANN-BRAGG HOLOGRAM

[75] Inventor: Hartwig Ruell, Fürstenfeldbruck, Fed. Rep. of Germany

[73] Assignee: Siemens Aktiengesellschaft, Berlin & Munich, Fed. Rep. of Germany

[21] Appl. No.: 770,292

[22] Filed: Feb. 22, 1977

[30] Foreign Application Priority Data

Mar. 26, 1976 [DE] Fed. Rep. of Germany ....... 2613034

[51] Int. Cl.² .................. G06K 19/06; G06K 7/10; G03H 1/04; G09F 3/02
[52] U.S. Cl. .................. 235/487; 235/457; 350/3.61; 40/2.2; 283/7
[58] Field of Search .......... 350/3.5, 3.6, 3.61; 235/61.12 N, 457, 487; 40/2.2; 283/7

[56] References Cited

U.S. PATENT DOCUMENTS

| | | | |
|---|---|---|---|
| 3,532,406 | 10/1970 | Hartman | 350/3.5 |
| 3,580,655 | 5/1971 | Leith et al. | 350/3.5 |
| 3,812,328 | 5/1974 | Tramposch | 235/61.12 |
| 3,838,252 | 9/1974 | Hynes et al. | 235/61.12 |
| 4,014,602 | 3/1977 | Ruell | 350/3.61 |

*Primary Examiner*—Daryl W. Cook
*Attorney, Agent, or Firm*—Hill, Van Santen, Steadman, Chiara & Simpson

[57] ABSTRACT

An identification card with a holographic security safeguard in the form of a large area Lippmann-Bragg hologram recorded on a layer or sheet-like carrier disposed on a face of the identification card, capable of being read out without the use of laser light, employing merely normal light sources which produce incoherent light, whereby an image can be observed with the naked eye, and which can contain both binary and analog information, comparable, for example, with printed and other information contained on the identification card; and a method of producing such a card.

3 Claims, 5 Drawing Figures

FALSIFICATION-PROOF IDENTIFICATION CARD HAVING A LIPPMANN-BRAGG HOLOGRAM

BACKGROUND OF THE INVENTION

The invention relates to an identification card with a holographic security provision in the form of a large area Lippmann-Bragg holographic recording medium carried by the card.

An identification card of this general type is known, in which the card is provided with a window having disposed therein a hologram which contains a check number in a binary code. The binary code is represented by the presence or absence of a predetermined light radiation at specific points arranged in a predetermined pattern, whereby upon illumination of the hologram with a laser beam, the pattern is reconstructed as an image and by means of a read out device, which includes light sensing elements for the various points of the pattern, such pattern can be decoded as a check number.

This known type of identification card does not provide maximum security against interference, as damage to the hologram disposed in the small window may prevent a reliable decoding of the check number contained therein. Further, security against falsification is not at an optimum as it is possible to punch out the hologram and replace it with a new one having a different check number, without altering the remainder of the information of the identication card.

Further, such type of known identification card possesses additional disadvantages in that the card must be transparent at the portion provided for the hologram and conventional identification cards thus cannot be readily combined with a hologram of this type. Further, the read out of the information stored in the hologram requires a laser necessitating a relatively high outlay for security checking. Further, the reconstructed image displays granulation, as is typical of laser radiation, and which can be disturbing during the read out of the stored information.

BRIEF SUMMARY OF THE INVENTION

The invention thus has among its objects a construction in which the information stored in the hologram can be read out by means of normal, commercial light sources. This objective is realized by the production of an identification card which, in accordance with the invention, utilizes a card carrying a holographic recording medium in the form of a layer-like sheet carried, for example, by one face of the card and adapted to receive a large area Lippmann-Bragg hologram which contains the items of security information.

Thus, the identification card of the invention has arranged on one side thereof a Lippmann-Bragg hologram which, in a preferred embodiment, occupies the entire area of the rear face of the identification card. Lippmann-Bragg holograms can be read out without the use of laser light merely with normal light sources which produce incoherent light, whereby an image is formed in the light reflected by the hologram which can be observed with the naked eye and the image can thus be compared, for example, with items of information on the other printed parts of the identification card.

Advantageously, in an identification card embodying the invention, no reflective coating is required, although the read out of the card is effected by means of reflected light.

The construction, furthermore advantageously enables the mounting of the hologram to the card by very simple means, such as gluing or ultrasonic welding, whereby it is impossible to separate the identification card from the hologram without a visible destruction of one or the other thereof.

In a preferred embodiment of the invention, the hologram contains both analogue as well as binary information so that the hologram can be read out by human beings as well as by machines.

Lippmann-Bragg holograms are known, per se, and are, for example, described in an article entitled White-Light Reconstruction of Holographic Images using the Lippmann-Bragg Diffraction Effect, by G. W. Stroke and A. E. Labeyrie, Phys. Letters 20, No. 4 (1966) pages 368–370.

In the production of a hologram of this type, recording is effected by impacting the layer or sheet-like storage medium from opposite directions whereby the interference planes may, for example, be created to lie parallel to the surface of the storage medium. If the storage medium utilized is, for example, a normal photo-emulsion, such as a silver halide emulsion, during the recording of the hologram, a system of surfaces of maximum density are formed deep in the emulsion, which surfaces extend basically parallel to the plane of the surface of the emulsion. Consequently, it is necessary that the recording medium, for example, the photo-emulsion have sufficient thickness to permit the formation and recording of a plurality of interference planes in the storage medium. The distance between adjacent interference planes amounts to approximately $\lambda/2$, where $\lambda$ is the wavelength of the laser light utilized. In the event helium-neon-lasers are employed, such distance amounts to approximately 0.3 $\mu$m. Consequently, in the development of the photo-emulsion a layer is formed, in which are embedded a number of partially reflective silver layers which function in the manner of an interference filter. If this structure, i.e. such Lippmann-Bragg hologram, is now illuminated with white light, which may be incoherent, every point of the group of surfaces represents the starting point of a reflected spherical wave with the reflected spherical waves being superimposed one upon the other in such manner that they reconstruct the image of the information stored in the hologram. As a result of the Bragg reflection on these layers, the precise wavelength with which the hologram has been recorded is filtered out. In an ideal storage medium this wavelength is in fact the recording wavelength. All of the other spectral components of the irradiated white light cannot be added up in correct phase and thus do not contribute to the image reconstruction. In the ideal situation, the reconstructed image thus appears in the same color as the light of the laser with which the hologram has been recorded.

However, in practice, the reconstructed image will possess a certain haziness of color which is undesirable, particularly in connection with a mechanical read out of the hologram. This color haziness can, however, be kept extremely small if the hologram is recorded in the manner hereinafter described, which is effective in eliminating interferences in the mechanical read out of such a hologram.

BRIEF DESCRIPTION OF THE DRAWINGS

In the drawings wherein like reference characters indicate like or corresponding elements.

DETAILED DESCRIPTION OF PREFERRED EMBODIMENTS OF THE INVENTION

Figure 1:
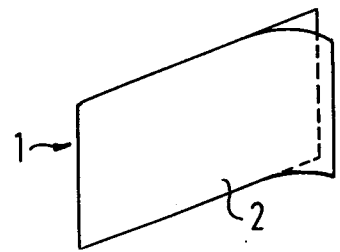
FIG. 1 is an isometric view of an identification card constructed in accordance with the invention.

Referring to FIG. 1, the reference numeral 1 designates generally an identification card having a front side which may be in the form of a conventional identification card constructed, for example, from a resistant paper, cardboard or synthetic material, on one side of which can be arranged, for example, a picture of the owner of the card and his signature. Mounted on the rear face of the identification card is a layer or sheet-like carrier 2 which is to contain the recorded hologram. This side of the identification card may, for example, represent the holographic reproduction of the conventional front side of the identification card and upon exposure of the hologram to light, an image is thus reconstructed which corresponds to the front side of such card. Such image thus represents holographically recorded analogue information. In addition, an item of binary information can also be holographically recorded whereby the identification card can also be mechanically read out.

Figure 2:
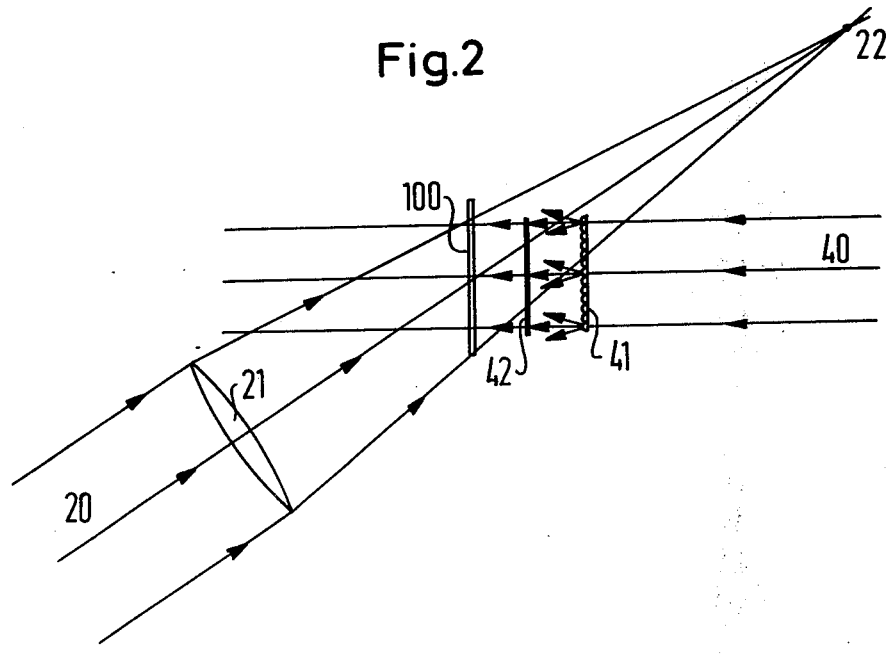
FIG. 2 semidiagrammatically illustrates the manner in which a hologram, in accordance with the invention, may be produced to record, for example, analogue information.

The analogue information may be holographically recorded in an advantageous manner, as illustrated in FIG. 2 in which type of recording a hologram will be formed which, on read out, supplies a virtual image of the recorded information.

Reference numeral 20 designates the reference beam which is illustrated as being focused, by means of a spherical lens 21, to a point 22 of convergence, while reference numeral 40 designates the object beam which passes through the object 42, and impacts the layer or sheet-like holographic recording medium 100, which may, for example, comprise a photographic layer. The object 42, is disposed in the path of the object beam 40 in front or ahead of the recording medium, with the object 42 being, for example, a photographic recording, i.e. a transparent image of the front side of the identification card. The distance between the recording medium and the object should be short in order to reduce the previously described effect of color haziness to a minimum. Such distance may be in the neighborhood of a few cm.

Advantageously, a diffusor 41 can be disposed in the path of the object beam, ahead of the object 42, to advantageously enable the holographically recorded image to be visible in a wide angular range on read out. It is also advantageous to have the information to be stored, i.e. the image points of the transparent image which are to be recorded holographically, to be so recorded on a relatively large surface area of the recording medium whereby on read out, a high freedom from disturbances is achieved with respect to scratches and similar damage to the finished hologram. If the object itself possesses sufficiently good properties of diffusion the diffusor 41 can be omitted.

Figure 3:
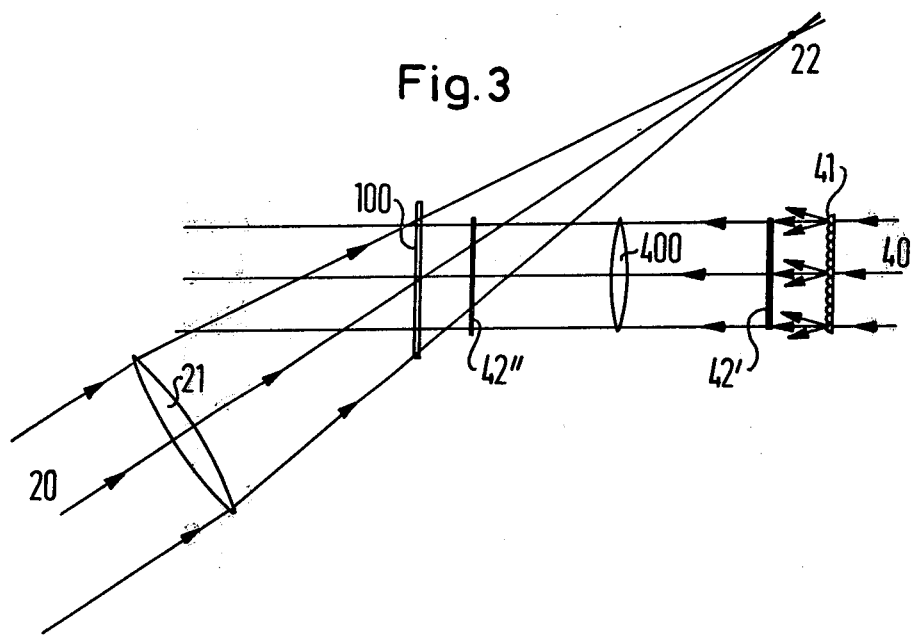
FIG. 3 is a figure similar to FIG. 2 illustrating a modified arrangement for producing such a hologram.

The arrangement illustrated in FIG. 2 can be modified as illustrated in FIG. 3 whereby an image of an object can be substituted for the real object. Thus, in FIG. 3, the object 42' is disposed at a distance from the recording medium and, by means of a lens 400, a real image 42" of the object 42' may be produced ahead of the recording medium 100. In this case, a diffusor 41 likewise may be disposed ahead of the actual object 42' relative to the direction of propagation of the object beam.

Figure 4:
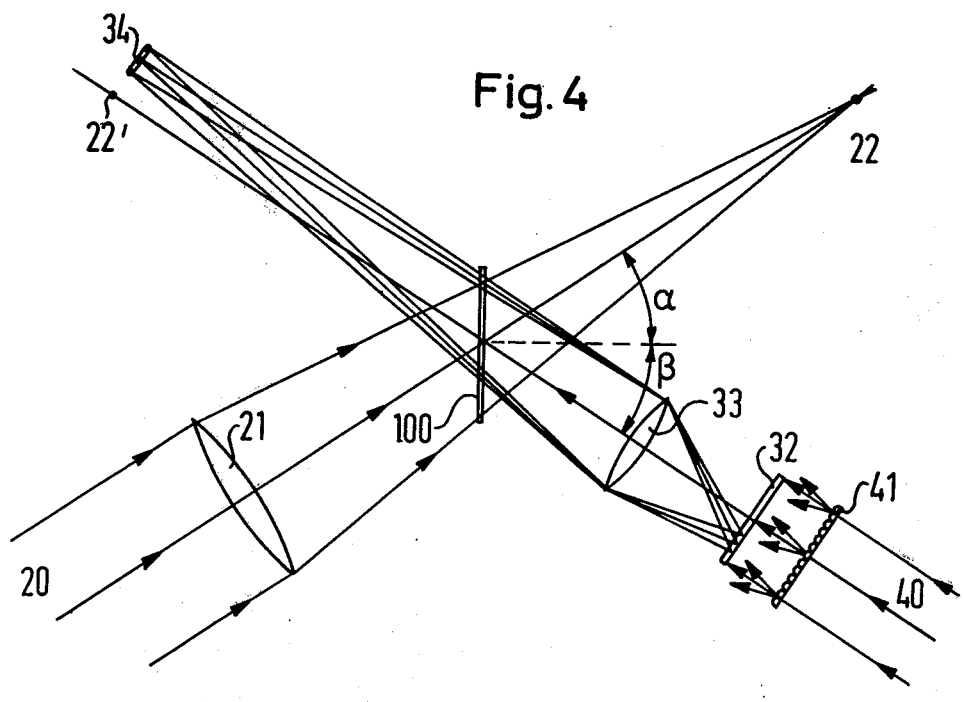
FIG. 4 is a similar figure illustrating the manner of recording binary information.

FIG. 4 illustrates how binary information may be holographically recorded in accordance with the invention. In this arrangement, the object beam 40 initially passes through data input means 32 which may, for example, be in the form of a known so-called page composer. By means of such a data input, a spot pattern, for example, can be produced, with the presence of a spot corresponding to a binary "1" and the absence of a spot corresponding to a binary "0". Such image of an item of binary information, i.e. spot pattern is focused by means of a lens 33 so that a real image 34 is formed, with the convergence point 22 of the reference beam and that of the real image 34 relative to the surface of the recording medium 100 being in an approximately mirror-symmetrical relationship to one another, with the normal to the surface of the recording medium forming an angle $\alpha$ with respect to the reference beam, and an angle $\beta$ with respect to the object beam wherein $\alpha$, at least approximately, equals $\beta$. It is expedient that no information be produced in areas of the page composer which would be reproduced on the point 22' which is mirror-symmetrical to the convergence point 22. Thus, it is particularly favorable that the real image 34 be somewhat laterally displaced relative to the mirror-symmetrical point 22'. This can be achieved, for example, by disposition of the pattern of the binary information, produced by the data input, adjacent the optical axis of the object beam. The optical axis of the object beam also can be inclined in such a manner that it is disposed at one side of the point 22'.

These features have the result that on read out of the hologram, generally a light beam may be utilized which is to a large extent identical to the reference beam. A part of such light beam is then reflected by the surface of the hologram onto the point 22', which reflection is so light that the holographically reconstructed image components in the vicinity thereof can be weak or faded. However, as a result of the described measures, it is possible to gate out such reflection as hereinafter described. Again, it is expedient to interpose a diffusor in the path of the object beam ahead of the data input whereby the formation of local over-exposed areas in the recording medium can be avoided. In all of the illustrated holographic recording methods, the previously described color haziness is virtually completely suppressed.

It will be appreciated that the method by means of which the recording of binary information can be effected, is also applicable to the recording of analogue information in which case a transparent image correspondingly positioned to the object 42 in FIGS. 2 and 3 may be provided at the location of the data input 32 of FIG. 4.

Recording of analogue and binary information can be effected simultaneously in all of the illustrated recording methods, two object beams being utilized, one for the analogue information and one for the digital information in combination with a common reference beam.

Figure 5:
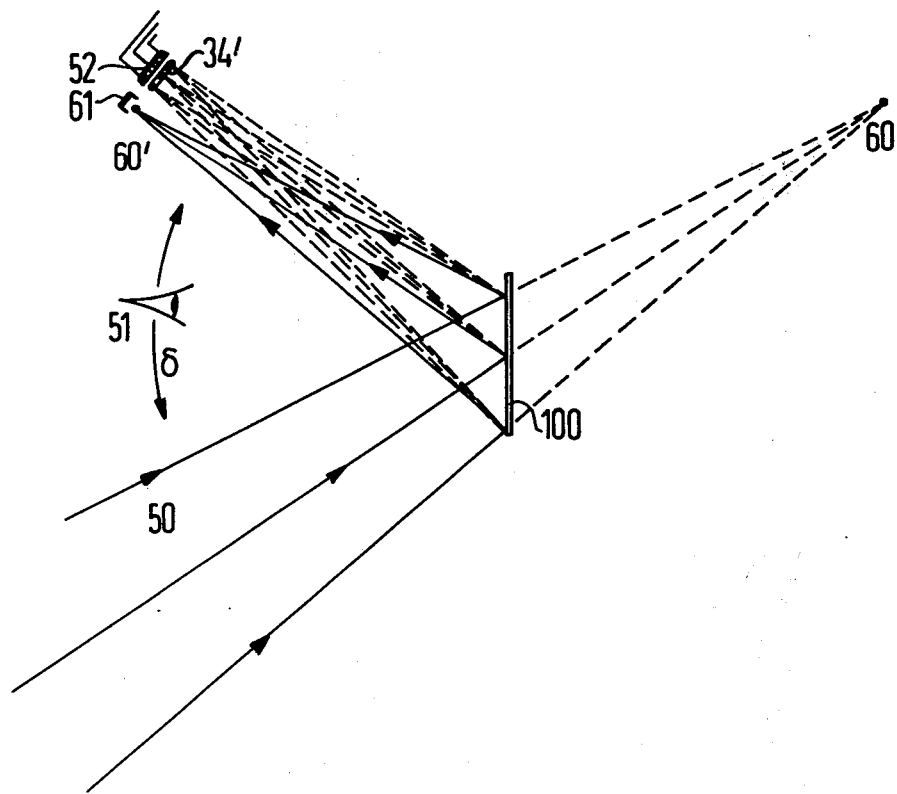
FIG. 5 is a similar figure illustrating the manner in which information stored in the hologram can be read out.

FIG. 5 illustrates the read out of holographic information produced as previously described. In this case, the recorded hologram 100 is illuminated with an arbitrary light source, the light of which contains the frequency spectrum of the laser utilized in the hologram recording and, as illustrated in FIG. 5, preferably convergent light is utilized, with the convergent read out light beam 50 having the same geometry as the reference beam utilized in the holographic recording operation. It will be appreciated that the more precisely the geometry of the two beams coincide, the slighter the image distortions in the holographic reconstructed image. The convergent light beam 50 thus strikes the hologram and is reflected thereby, forming a virtual image of the analogue information, which may be observed as indicated by the representation 51 of an eye, and in addition, a real image 34' of the recorded binary information is produced. Advantageously, a suitable data read-out device, for example a light detector matrix 52, may be positioned at the real image 34, whereby the binary information may be mechanically read out. As the recording of the holograms was effected in conjunction with a diffusor, the holographically reconstructed virtual images will be visible in a relatively wide angular range δ.

The reference numeral 60 designates the convergence point of the light while the point 60' is mirror-symmetrical to such point relative to the hologram plane and, as will be apparent, the reflection of the light source used for the read out would be reflected by the hologram surface to such point. Consequently, to avoid a dazzling of the eye of the viewer, this reflection can be blocked out by a suitable obstruction 61 which is impermeable to light since, as a result of the above described measures, the real image does not fall on this point.

In an exemplary embodiment of the invention, a normal photo emulsion having a thickness of 7 μm was utilized as the holographic recording media. Additional materials which may be employed are described in the publication "Storage Materials for Laser Recording", R. Anwyl, Proc. of the SPIE, Vol. 53, pages 15–21, which also describe methods by means of which recording media can be developed, particularly rapidly. A high speed development of the recording media has the advantage that such media need be exposed to liquids for only a short period of time, whereby little, if any swelling or shrinking processes take place in the recording media. As a result, the quality of the hologram is especially high.

Photo-dielectric polymers which require no chemical development and which possess a high resolution are also highly suitable as recording media. Layer thicknesses of a few μm to a few mm can be readily produced within minutes by casting or other suitable procedures. In this case, metal structures or other protective means can be embedded into the layer. However, material of this type requires an energy density during recording which is several orders greater than conventional photo-layers. The low light sensitivity of such material affords an advantage when employed in connection with an identification card since a mono-mode giant pulse laser is required for effecting a recording in this material, which type of laser is considerably less readily available to a forger than a low-energy laser.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. An identification card with conventional, particularly printed information and with a holographic security safeguard, comprising a card body, at least one side of which is provided with a layer-like carrier and a Lippmann-Bragg hologram carried by said carrier, which hologram generally covers the entire rear face of the identification card body and contains items of security information, the front face of said card containing conventional identification information.

2. An identification card according to claim 1, wherein both analogue and binary information are recorded in the Lippmann-Bragg hologram.

3. An identification card according to claim 2, wherein the holographically recorded items of analogue information are identical with at least a portion of the conventional information carried by the card.

* * * * *